United States Patent
Arai et al.

(10) Patent No.: US 7,280,444 B2
(45) Date of Patent: Oct. 9, 2007

(54) OBJECTIVE OPTICAL ELEMENT, OPTICAL PICKUP DEVICE, AND OPTICAL INFORMATION RECORDING AND REPRODUCING DEVICE

(75) Inventors: Norikazu Arai, Tokyo (JP); Shinichiro Saito, Tokyo (JP)

(73) Assignee: Konica Minolta Opto, Inc., Tokyo (JP)

( * ) Notice: Subject to any disclaimer, the term of this patent is extended or adjusted under 35 U.S.C. 154(b) by 614 days.

(21) Appl. No.: 10/824,758

(22) Filed: Apr. 14, 2004

(65) Prior Publication Data
US 2004/0213136 A1 Oct. 28, 2004

(30) Foreign Application Priority Data
Apr. 22, 2003 (JP) .............................. 2003-117190

(51) Int. Cl.
*G11B 7/00* (2006.01)
(52) U.S. Cl. .............................. 369/44.23; 369/112.23; 369/44.25
(58) Field of Classification Search ..................... None
See application file for complete search history.

(56) References Cited

U.S. PATENT DOCUMENTS

2001/0008513 A1* 7/2001 Arai et al. ............. 369/112.08
2002/0181366 A1* 12/2002 Katayama .................. 369/53.2

* cited by examiner

*Primary Examiner*—Muhammad Edun
(74) *Attorney, Agent, or Firm*—Cohen Pontani Lieberman & Pavane LLP

(57) ABSTRACT

An objective optical element to be used for an optical pickup device for performing reproducing and/or recording of information to a first optical information recording medium and a second optical information recording medium by converging a light beam having a wavelength $\lambda1$ (640 nm $\leq \lambda1 \leq$ 670 nm) on the first optical information recording medium having a protective substrate thickness t1, and by converging a light beam having a wavelength $\lambda2$ (400 nm $\leq \lambda2 \leq$ 415 nm) on the second optical information recording medium having a protective substrate thickness t2; wherein an optical system magnification m1 satisfies a relation of $|m1|<0.01$, and wherein an optical system magnification m2 satisfies a relation of $|m2|<0.01$.

12 Claims, 6 Drawing Sheets

OBJECTIVE OPTICAL ELEMENT, OPTICAL PICKUP DEVICE, AND OPTICAL INFORMATION RECORDING AND REPRODUCING DEVICE

TECHNICAL FIELD

The present invention relates to an objective optical element, an optical pickup device, and an optical information recording and reproducing device.

TECHNICAL BACKGROUND

In recent years, research and development concerning the so-called high density optical disc have been proceeding. In the high density optical disc, the recording density of an optical information recording medium (an optical disc) is increased by the use of a blue laser beam having a wavelength of about 400 nm, and then the storage capacity of the optical information recording medium is increased.

As the standards of the high density optical disc, for example, a standard regulating the numerical aperture (NA) on an image side of an objective lens to be about 0.85 and the thickness of a protective substrate to be about 0.1 mm, and a standard regulating the NA and the thickness of the protective substrate to be about 0.65 and about 0.6 mm or less, respectively, at the same level as those of a conventional digital versatile disc (DVD) are known. In the following description, a high density optical disc having an NA of about 0.65 and the thickness of a protective substrate of about 0.6 mm will be referred to as an "advanced optical disc (AOD)".

Then, various techniques pertaining to optical pickup devices compatible with such high density optical discs and conventionally wide used optical discs such as DVD's and compact discs (CD's) have been proposed. For example, one of them is disclosed in Unexamined Japanese Patent Application Publication No. 2002-298422.

Because the compatible optical pickup device uses optical beams each having a different wavelength from each other (for example, about 400 nm for the AOD, and about 650 nm for the DVD), the compatible optical pickup device is required to correct spherical chromatic aberrations caused by the wavelength difference into a level at which no troubles are caused practically.

Moreover, for example, when the so-called mode hop, at which the wavelength of a light beam instantaneously changes, is generated at the time of increase of the power of the light beam emitted from a light source, the problem that the position of a converging spot formed on an optical axis shifts from an information recording surface of an optical disc into an optical axis direction is caused. Consequently, it is necessary to perform a correction for decreasing the quantity of a change of the converging spot in the optical axis direction before and after the wavelength change to suppress axial chromatic aberrations.

In particular, in the AOD, the quantity of the wavelength change at the time of the mode hop is large owing to the relatively large NA of about 0.65 and the short of the wavelength of the light beam being about 400 nm. Consequently, there is the problem that the quantity of the shift of the converging spot is large.

The objective lens disclosed in the above-mentioned publication suppresses a chromatic aberration on an axis caused by a change of the wavelength of a blue laser beam without excessively correcting the chromatic aberration on the axis in a DVD, by proving a diffractive structure (a diffraction lens structure) on an optical surface on one side of an objective lens, and by adopting beams having different orders of diffraction on a short wavelength side and a long wavelength side.

However, because the publication does not disclose any techniques for correcting the spherical chromatic aberration caused by a difference between wavelengths, there is the case where information cannot be recorded or reproduced appropriately when a plurality of recording media such as a high density optical disc and a DVD is used.

SUMMARY

With consideration of the above-mentioned problems, an object of the present invention is to provide an objective optical element, an optical pickup device and an optical information recording and reproducing device, all having compatibility of the AOD with the other optical information recording media and capable of suppressing spherical chromatic aberrations caused by wavelength differences with a simple method.

The object can be achieved by each of the following configurations.

In accordance with a first aspect of the invention, an objective optical element to be used for an optical pickup device for performing reproducing and/or recording of information to a first optical information recording medium and a second optical information recording medium by converging a light beam having a wavelength $\lambda 1$ (640 nm$\leq \lambda 1 \leq$670 nm) on an information recording surface of the first optical information recording medium having a protective substrate thickness t1 (t1=0.6 mm), and by converging a light beam having a wavelength $\lambda 2$ (400 nm$\leq \lambda 2 \leq$415 nm) on an information recording surface of the second optical information recording medium having a protective substrate thickness t2;

wherein an optical system magnification m1 of the objective optical element to the light beam having the wavelength $\lambda 1$, satisfies a relation of $|m1|<0.01$, the objective optical element has a numerical aperture NA1 of a converging spot formed on the information recording surface of the first optical information recording medium, and the numerical aperture NA1 satisfies a relation of $0.60 \leq NA1 \leq 0.70$, and wherein an optical system magnification m2 of the objective optical element to the light beam having the wavelength $\lambda 2$ satisfies a relation of $|m2|<0.01$, and the protective substrate thickness t2 satisfies a relation of 0.70 mm$\leq t2 \leq$0.77 mm.

According to the first aspect of the invention, even when the so-called infinite system in which almost parallel light enters an objective optical element (an objective lens) at the time of use of the first optical information recording medium is adopted and the design of optimizing the spherical aberration of the light beam having the wavelength $\lambda 1$ is adopted, the optical pickup device in which spherical chromatic aberrations of the light beam having the wavelength $\lambda 2$ are corrected with the infinite system also at the time of use of the second optical information recording medium can be obtained by setting the protective substrate thickness t2 within the range of 0.70 mm$\leq t2 \leq$0.77 mm.

Moreover, in the first aspect, because the spherical chromatic aberrations can sufficiently be corrected without providing any fine structures such as a diffractive structure on the objective lens for correcting the spherical chromatic aberrations caused by wavelength differences, the objective lens can be molded with glass, and consequently the optical pickup device which is difficult to be influenced by temperature changes and is superior in temperature characteristic can be obtained.

In accordance with a second aspect of the invention, an objective optical element to be used for an optical pickup device for performing reproducing and/or recording of information to a first optical information recording medium and a second optical information recording medium by converging a light beam having a wavelength $\lambda 1$ (640 nm$\leq\lambda 1\leq$670 nm) on an information recording surface of the first optical information recording medium having a protective substrate thickness t1 (t1=0.6 mm), and by converging a light beam having a wavelength $\lambda 2$ (400 nm$\leq\lambda 2\leq$415 nm) on an information recording surface of the second optical information recording medium having a protective substrate thickness t2 (t2=0.6 mm);

wherein an optical system magnification m2 of the objective optical element to the light beam having the wavelength $\lambda 2$ satisfies a relation of $|m2|<0.01$, and wherein an optical system magnification m1 of the objective optical element to the light beam having the wavelength $\lambda 1$ satisfies a relation of $-\frac{1}{20}\leq m1\leq -\frac{1}{200}$.

According to the second aspect, the structure in which the optical system magnification m1 to the light beam having the wavelength $\lambda 1$ is set within the range of $-\frac{1}{20}\leq m1\leq -\frac{1}{200}$ and divergent light inclining to an optical axis slightly enters the objective optical element is adopted, and thereby the optical pickup device in which the spherical chromatic aberration of the light beam having the wavelength $\lambda 2$ is corrected with the infinite system at the time of use of the second optical information recording medium having the protective substrate thickness t2 of 0.6 mm can be obtained.

By setting the optical system magnification m1 to be within the aforesaid range, no residual aberrations pertaining to the light beam having the wavelength $\lambda 2$ are generated, and off-axis characteristics pertaining to the light beam having the wavelength $\lambda 1$ can be held well.

Moreover, because the spherical chromatic aberrations can be sufficiently corrected without providing any fine structures such as the diffractive structure on the objective lens for correcting the spherical chromatic aberrations caused by wavelength differences, the objective lens can be molded with glass. Consequently, the optical pickup device which is difficult to be influenced by temperature changes and is superior in temperature characteristics can be obtained.

In accordance with a third aspect of the invention, an objective optical element to be used for an optical pickup device for performing reproducing and/or recording of information to a first optical information recording medium and a second optical information recording medium by converging a light beam having a wavelength $\lambda 1$ (640 nm$\leq\lambda 1\leq$670 nm) on an information recording surface of the first optical information recording medium having a protective substrate thickness t1 (t1=0.6 mm), and by converging a light beam having a wavelength $\lambda 2$ (400 nm$\leq\lambda 2\leq$415 nm) on an information recording surface of the second optical information recording medium having a protective substrate thickness t2 (t2=0.6 mm);

wherein an optical system magnification m1 of the objective optical element to the light beam having the wavelength $\lambda 1$ satisfies a relation of $|m1|<0.01$, and wherein an optical system magnification m2 of the objective optical element to the light beam having the wavelength $\lambda 2$ satisfies a relation of $-\frac{1}{20}\leq m2\leq -\frac{1}{200}$.

According to the third aspect, the structure in which the optical system magnification m2 to the light beam having the wavelength $\lambda 2$ is set within the range of $-\frac{1}{20}\leq m2\leq -\frac{1}{200}$ and divergent light inclining to an optical axis slightly enters the objective optical element is adopted, and thereby the optical pickup device in which the spherical chromatic aberration of the light beam having the wavelength $\lambda 1$ is corrected with the infinite system at the time of use of the first optical information recording medium having the protective substrate thickness t1 of 0.6 mm can be obtained.

By setting the optical system magnification m2 to be within the aforesaid range, no residual aberrations pertaining to the light beam having the wavelength $\lambda 1$ are generated, and off-axis characteristics pertaining to the light beam having the wavelength $\lambda 2$ can be held well.

Moreover, because spherical chromatic aberrations can be sufficiently corrected without providing any fine structures such as the diffractive structure on the objective lens for correcting the spherical chromatic aberrations caused by wavelength differences, the objective-lens can be molded with glass. Consequently, the optical pickup device which is difficult to be influenced by temperature changes and is superior in temperature characteristic can be obtained.

In accordance with a fourth aspect of the present invention, an optical pickup device comprises: a first light source for emitting a first light beam having a wavelength $\lambda 1$ (640 nm$\leq\lambda 1\leq$670 nm), a second light source for emitting a second light beam having a wavelength $\lambda 2$ (400 nm$\leq\lambda 2\leq$415 nm), and a converging optical system for converging the first light beam having the wavelength $\lambda 1$ on an information recording surface of a first optical information recording medium having a protective substrate having a thickness of t1 (t1=0.6 mm), and for converging the second light beam having the wavelength $\lambda 2$ on an information recording surface of a second optical information recording medium having a protective substrate having a thickness of t2, wherein the converging optical system comprises an objective optical element according to the first aspect.

In accordance with a fifth aspect of the present invention, an optical pickup device comprises: a first light source for emitting a first light beam having a wavelength $\lambda 1$ (640 nm$\leq\lambda 1\leq$670 nm), a second light source for emitting a second light beam having a wavelength $\lambda 2$ (400 nm$\leq\lambda 2\leq$415 nm), and a converging optical system for converging the first light beam having the wavelength $\lambda 1$ on an information recording surface of a first optical information recording medium having a protective substrate having a thickness of t1 (t1=0.6 mm), and for converging the second light beam having the wavelength $\lambda 2$ on an information recording surface of a second optical information recording medium having a protective substrate having a thickness of t2 (t2=0.6 mm), wherein the converging optical system comprises an objective optical element according to the second aspect.

In accordance with a sixth aspect of the present invention, an optical pickup device comprising: a first light source for emitting a first light beam having a wavelength $\lambda 1$ (640 nm$\leq\lambda 1\leq$670 nm), a second light source for emitting a second light beam having a wavelength $\lambda 2$ (400 nm$\leq\lambda 2\leq$415 nm), and a converging optical system for converging the first light beam having the wavelength $\lambda 1$ on an information recording surface of a first optical information recording medium having a protective substrate having a thickness of t1 (t1=0.6 mm), and for converging the second light beam having the wavelength $\lambda 2$ on an information recording surface of a second optical information recording medium having a protective substrate having a thickness of t2 (t2=0.6 mm), wherein the converging optical system comprises an objective optical element according to the third aspect.

In accordance with a seventh aspect of the present invention, an optical information recording and reproducing device comprises the above-described optical pickup device, wherein at least one of recording of information to the first optical information recording medium and the second optical information recording medium and reproducing of information recorded to the first optical information recording medium and the second optical information recording medium, is executable.

DETAILED DESCRIPTION OF THE INVENTION

It is preferable that the objective optical element of the present invention comprises a single lens, and a dispersion value νd of a lens material of the single lens satisfies a relation of νd≧50.

Figure 7:
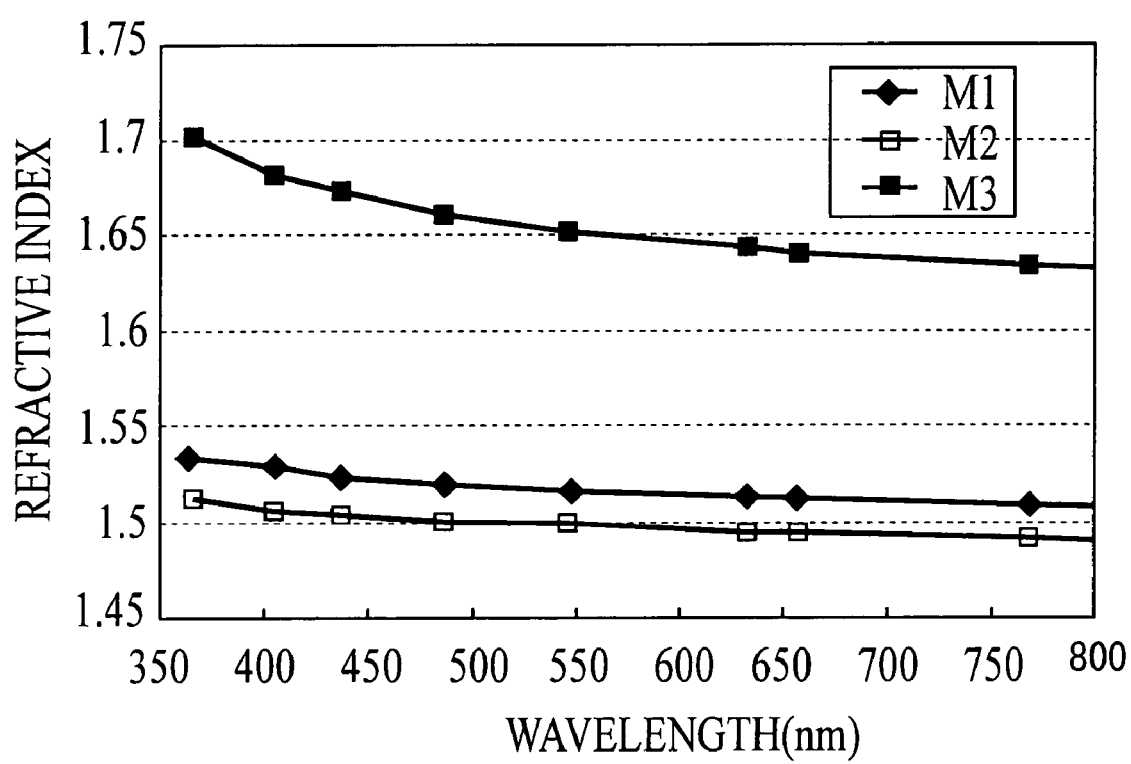
FIG. 7 is a graph showing the relations of wavelengths and refractive indices with regard to three kinds of lens materials each having a dispersion value different from one another.

The setting of the dispersion value νd of a single objective lens to be 50 or more enables the improvement of a wavelength characteristic. FIG. 7 shows relations of wavelengths and refractive indices of three kinds of lens materials (M1 to M3) each having a dispersion value different from one another. Generally, refractive indices of lens materials (optical materials) are not linear to wavelengths. Moreover, the refractive indices have the large so-called wavelength dependency such that the rates of refractive index changes to wavelength changes become larger on a shorter wavelength side, and the wavelength dependency of the refractive indices differs greatly to lens materials. By molding the objective lenses with the lens materials (M1 and M2) each having the dispersion value νd to be 50 or more with consideration of these respects, it becomes possible to suppress the wavelength dependency to be small. For example, even when a mode hop is produced at the time of the recording of information on an optical information recording medium, it is possible to suppress the refractive index changes to be small, and to make the change quantity of a converging spot in an optical axis direction small.

In the objective optical element of the first aspect, it is possible that the protective substrate thickness t2 satisfies a relation of 0.72 mm≦t2≦0.76 mm.

Generally, when a protective substrate thickness is large, the generation quantity of a coma aberration at the time of the inclination of an optical information recording medium during being driven into the optical axis direction becomes large. Accordingly, the generation quantity of the coma aberration can be suppressed by the setting of the protective substrate thickness t2 to be within the aforesaid range.

It is preferable that the objective optical element of the present invention comprises a single lens, and a dispersion value νd of a lens material of the single lens satisfies a relation of νd≧50.

The setting of the dispersion value νd of the single objective lens to be 50 or more makes it possible to improve the wavelength characteristic.

It is preferable that the objective optical element further comprises a correction function for suppressing a value of $|\Delta fB/(\lambda 2-\lambda 2')|$ to be 1.0 μm/nm or less, where ΔfB μm denotes a distance in an optical axis direction between two converging spots formed by the light beam having the wavelength λ2 and a light beam having a wavelength λ2', respectively, when the wavelength λ2 of the light beam is changed to λ2'.

In the specification, the term "converging spot" indicates a spot formed on a defocus position in which wave front aberration of a light conversed by the objective lens is the smallest. Therefore, the difference ΔfB=fB2'-fB2 between the defocus position fB2 on which the converging spot is formed when the light beam having the wavelength λ2 enters the objective lens, and the defocus position fB2' on which the converging spot is formed when the light beam having the wavelength λ2' enters the objective lens, is the "distance in an optical axis direction between converging spots".

When the objective optical element includes the correction function to suppress the value $|\Delta fB/(\lambda 2-\lambda 2')|$ defined by means of the distance ΔfB μm in the optical axis direction of the two converging spots formed by the light beams before and after the wavelength change, respectively, to be 1.0 μm/nm or less, the change quantity of the converging spots in the optical axis direction at the time of the occurrence of the mode hop can be made to be small. Consequently, the correction function is preferable for the objective optical element.

When a wavelength has changed from λ to λ' at a short period of time at, for example, the time of a mode hop of a light source, the follow-up of tracking cannot be in time. Consequently, the control of optical signals is performed at a defocused position before the wavelength change. Accordingly, by the correction of the change of the defocused positions of the objective lens before and after a wavelength change into the aforesaid range, i.e. by the suppression of the value of $|\Delta fB/(\lambda 2-\lambda 2')|$ to be 1.0 μm/nm or less, the deterioration of a wave front aberration can be suppressed, and the control of an optical signal can be performed well.

It is preferable that the objective optical element of the present invention further comprises a phase difference producing structure for producing a phase difference of a passing light beam on an at least one optical surface.

By the configuration described above, when a wavelength has changed from λ2 to λ2' by a mode hop, the phase difference producing structure produces a prescribed phase difference to, for example, the light beam having the wavelength λ2' to make it possible to adjust the convergence position of the light beam lest the distance in the optical axis direction between the two converging spots formed by the respective light beams should become large.

It is preferable that a correction function for suppressing a value of $|\Delta fB/(\lambda 2-\lambda 2')|$ to be 0.1 μm/nm or less is obtained by the phase difference producing structure, where ΔfB μm denotes a distance in an optical axis direction between two converging spots formed by the light beam having the wavelength λ2 and a light beam having a wavelength λ2' respectively, when the wavelength λ2 of the light beam is changed to λ2'.

The provision of the phase difference producing structure having the aforesaid function enables the especial decreasing of the change quantity of a converging spot in the optical axis direction at the time of the occurrence of a mode hop, and enables the especial suppression of the deterioration of a wave front aberration.

In the optical pickup device of each of the fourth to sixth aspects, it is preferable that the converging optical system comprises an optical element for carrying out a correction that a value of |ΔfB'/(λ2−λ2')| to be 0.1 μm/nm or less, where ΔfB' μm denotes a distance in an optical axis direction between two converging spots formed by passing the light beam having the wavelength λ2 and a light beam having a wavelength λ2' through the converging optical system, respectively, when the wavelength λ2 of the light beam is changed to λ2'.

The converging optical system's provision of the optical element for the correction of the value |ΔfB/(λ2−λ2')| defined by means of the distance ΔfB μm in the optical axis direction between the two converging spots formed by the light beams before and after the wavelength change to be 1.0 μm/nm or less makes it possible to decrease the change quantity of the converging spots in the optical axis direction at the time of the occurrence of a mode hop.

As the optical element, a collimator lens, a beam expander, both changing the divergence angle of an incident light beam to emit the changed incident beam, a beam shaping element changing the light intensity distribution of an incident light beam to emit the changed incident beam, and the like can be used.

It is preferable that the correction is carried out by moving the optical element in the optical axis direction.

It is preferable that the optical element comprises a phase difference producing structure for producing a phase difference of a passing light beam on an at least one optical surface, and the correction is carried out by the phase difference producing structure.

Further, it is preferable that the phase difference producing structure is a diffractive structure for converging an n-th (n is a natural number) order diffracted light generated by producing a phase difference in the light beam having the wavelength λ1 with the phase difference producing structure on the information recording surface of the first optical information recording medium, and for converging an m-th (m≠n: m is a natural number) order diffracted light generated by producing a phase difference in the light beam having the wavelength λ2 with the phase difference producing structure on the information recording surface of the second optical information recording medium.

A selection of a combination of the wavelengths λ1 and λ2 which make the diffraction efficiency large enables the ensuring of a sufficient quantity of light for the recording and/or the reproducing of information. Incidentally, preferable combinations of diffraction orders include (n, m)=(2, 3), (3, 5).

FIRST EMBODIMENT

The preferred embodiments of an objective optical element, an optical pickup device and an optical information recording and reproducing device according to the present invention will be described by reference to the attached drawings.

Figure 1:
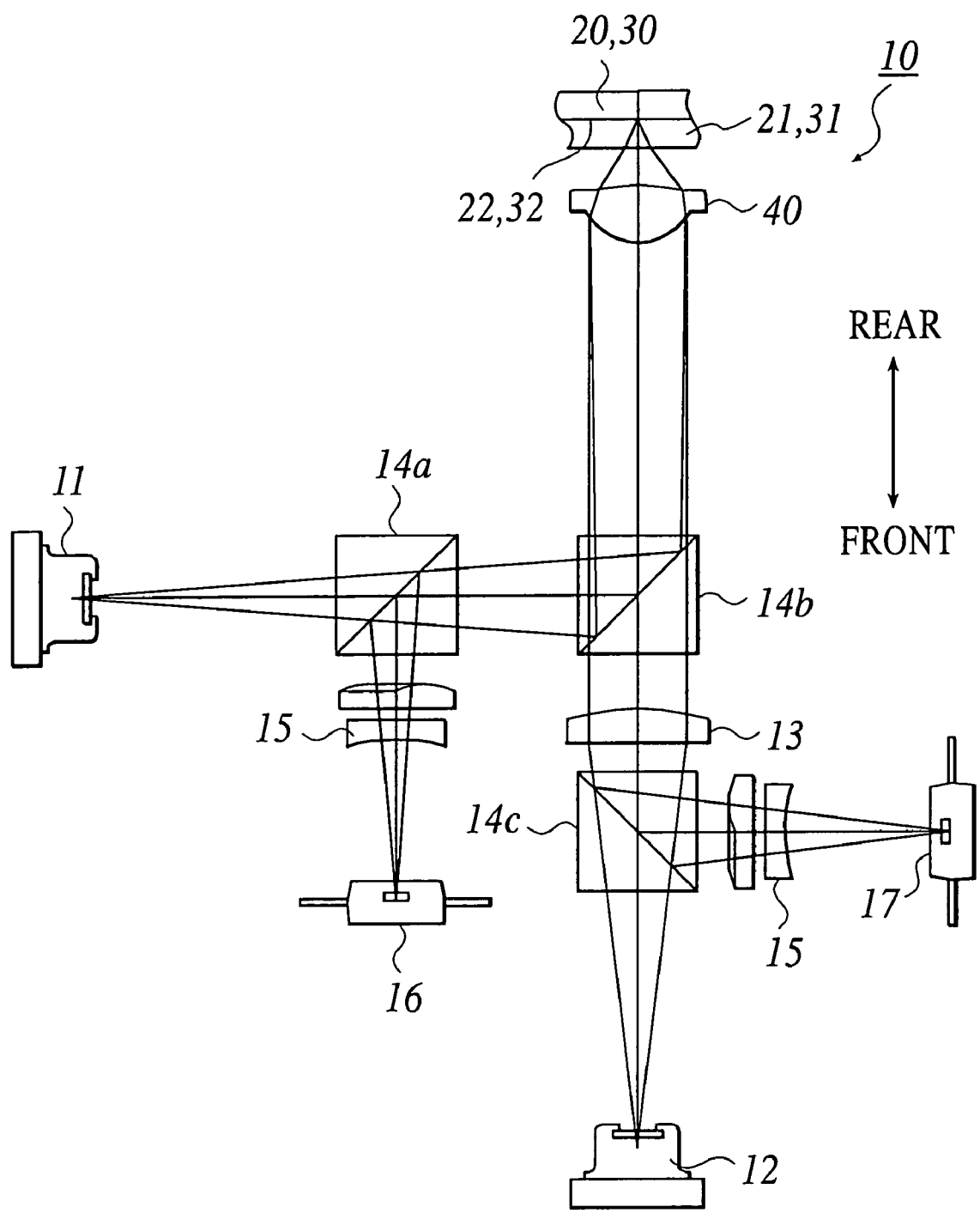
FIG. 1 is a schematic view showing an example of an optical pickup device according to a first embodiment.

As shown in FIG. 1, the present embodiment includes a first light source 11 and a second light source 12, which emit light beams having a wavelength λ1 (640 nm≦λ1≦670 nm) and a wavelength λ2 (400 nm≦λ2≦415 nm), respectively. The present embodiment is configured so as to have compatibility such that the recording and/or the reproducing of information can be performed to a first optical information recording medium 20 (a DVD in the present embodiment) having a protective substrate thickness t1 (0.6 mm) and a second optical information recording medium 30 (an AOD in the present embodiment) having a protective substrate thickness t2 (0.6 mm) by means of each of the light beams.

Incidentally, because the protective substrate thicknesses t1 and t2 are equal to each other in the present embodiment, a protective substrate 21 of the DVD and a protective substrate 31 of the AOD are shown as the same component in FIG. 1.

First, the configuration of an optical pickup device will be described.

As shown in FIG. 1, the optical pickup device is schematically composed of the first light source 11, the second light source 12, a collimator lens 13, a first to a third beam splitters 14a-14c, a single objective lens 40 (an objective optical element), a two-dimensional actuator (not shown) for moving the objective lens 40 into a prescribed direction, a concave lens 15, a first photo-detector 16 and a second photo-detector 17 for detecting reflected light from each optical disc, respectively, and the like.

In the present embodiment, a converging optical system is composed of the collimator lens 13, the first to the third beam splitters 14a-14c and the objective lens 40.

Moreover, an optical system magnification m1 of the objective lens 40 to a light beam having the wavelength λ1 is within a range of −1/20≦m1≦−1/200. An optical system magnification m2 of the objective lens 40 to a light beam having the wavelength λ2 is within a range of |m2|<0.010, namely nearly 0. Consequently, the light beam having the wavelength λ1 enters the objective lens 40 as a divergent light beam inclining slightly to an optical axis L, and the light beam having the wavelength λ2 enters the objective lens 40 as a parallel light beam.

Incidentally, the optical system magnification m1 to the light beam having the wavelength λ1 may be within a range of |m1|<0.01, and the optical system magnification m2 of the light beam having the wavelength λ2 may be within a range of −1/20≦m2≦−1/200.

Because the actions of the optical pickup device 10 are well known, their detailed descriptions are omitted. A divergent light beam which has the wavelength λ1 and has been emitted from the first light source 11 passes through the first beam splitter 14a, and is reflected by the second beam splitter 14b to enter the objective lens 40.

Then, the light beam which has entered the objective lens 40 receives refraction operation on an incidence surface 41 and on an exit surface 42 of the objective lens 40, and the light beam converges onto an information recording plane 22 of the DVD to form a converging spot P on the optical axis L. Then, the light beam having the wavelength λ1 is modulated by an information pit on the information recording plane 22 to be reflected. The reflected light beam again passes through the objective lens 40, and is reflected by the second beam splitter 14b to be split.

Then, the split light beam having the wavelength λ1 is reflected by the first beam splitter 14a to be split. The again split light beam enters the first photo-detector 16 through the concave lens 15.

Then, the first photo-detector 16 detects the spot of the incident light to output a signal, and obtains a read signal of information recorded on the DVD by the use of the output signal.

Moreover, focusing detection and track detection are performed by the detection of the change of the quantity of light and the like owing to the change of the shape and the change of the position of a spot on the first photo-detector 16. On the basis of the detection result, the two-dimensional actuator moves the objective lens 40 in a focus direction and a tracking direction in order that the light beam having the wavelength $\lambda 1$ may form a spot on the information recording plane 22 precisely.

Next, the light beam which has the wavelength $\lambda 2$ and has been emitted from the second light source 12 passes through the third beam splitter 14c, and is made to be a parallel light beam by the collimator lens 13. Then, the parallel light beam passes through the second beam splitter 14b to reach the objective lens 40. A diffractive structure as a phase difference producing structure 50 is formed on the incidence surface 41 of the objective lens 40, which diffractive structure 50 will be described later in detail, and the light beam having the wavelength $\lambda 2$ receives refraction operation on the incidence surface 41 and the exit surface 42 of the objective lens 40 together with diffraction operation on the incidence surface 41. Then, the light beam is emitted from the objective lens 40.

After that, the emitted light converges on an information recording plane 32 of the AOD to form a spot P on the optical axis L. Then, the light beam having the wavelength $\lambda 2$, which has converged to the spot P, is modulated by an information pit on the information recording plane 32 and reflected thereby. The reflected light beam again passes through the objective lens 40, the second beam splitter 14b and the collimator lens 13, and is reflected and split by the third beam splitter 14c. After that, the actions of the light beam having the wavelength $\lambda 2$ are similar to those of the light beam having the wavelength $\lambda 1$.

Figure 2:
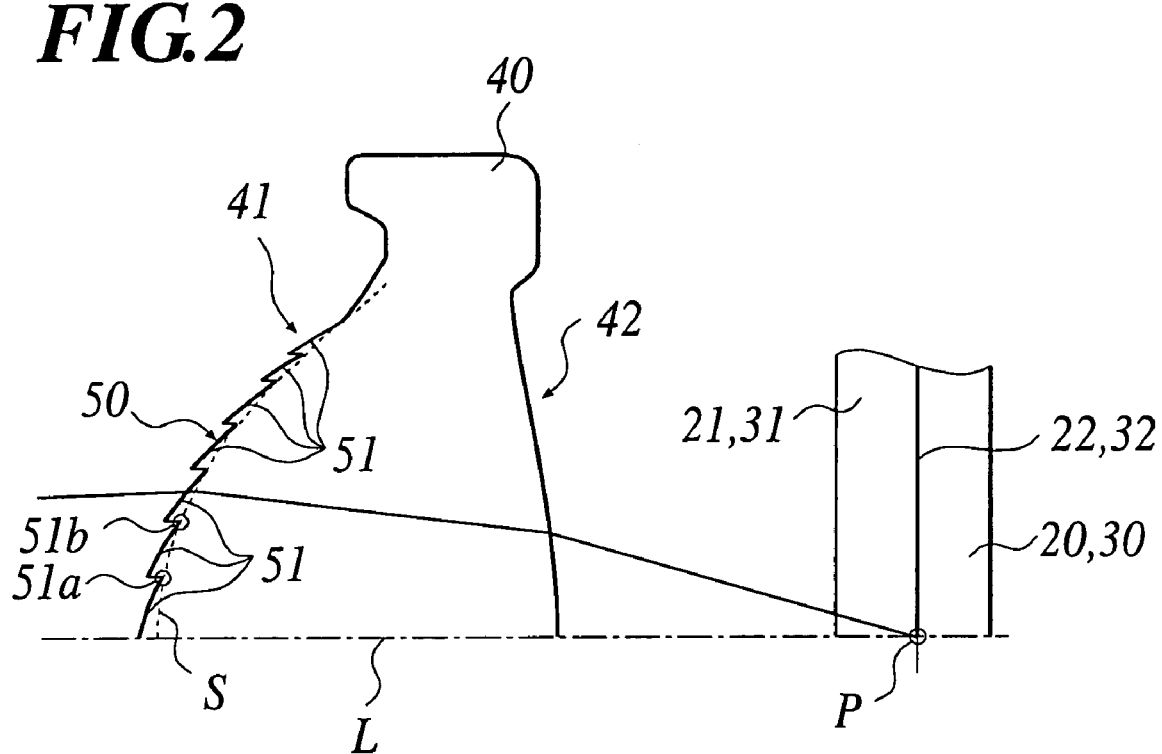
FIG. 2 is a transverse sectional view showing the principal part of the structure of an objective lens.

As shown in FIG. 2, the objective lens 40 is a single lens having both sides of the incidence surface 41 and the exit surface 42, both of which are aspheric surfaces. A dispersion value vd of the material of the lens 40 is 50 or more. By the formation of the lens 40 having the dispersion value vd equal to or more than 50, the wavelength characteristic of the objective lens 40 can be improved.

Moreover, in the whole area of the incidence surface 41, the phase difference producing structure 50 for producing a prescribed phase difference to the incident light beam is formed.

In the present embodiment, the phase difference producing structure 50 is composed of a plurality of diffraction rings 51 formed to be almost concentric circles around the optical axis L as their centers. The diffraction rings 51 include the operation of diffracting the incident light beam.

Each of the diffraction rings 51 is formed in a shape of a sawtooth when it is seen from a plane (a meridional cross section) along the optical axis L. The diffraction rings 51 perform the diffraction operation of a specific wavelength light beam entering each of the diffraction rings 51 by producing a prescribed phase difference to the light beam.

A starting point 51a and an end point 51b (both designated in FIG. 2 only at one position severally) of each of the diffraction rings 51 are positioned on a prescribed aspheric surface S (hereinafter referred to as a "mother aspheric surface") shown in FIG. 2, and the shape of each of the diffraction rings 51 can be regulated by means of the displacement magnitude of the diffraction ring 51 from the mother aspheric surface S into the direction of the optical axis L.

Moreover, the mother aspheric surface S can be defined with a function pertaining to a distance from the optical axis L around the optical axis L as its rotation center. Incidentally, because the designing methods of the diffraction ring 51 are well known, the descriptions of the methods are omitted. Moreover, the phase difference producing structure 50 may be formed only on the exit surface 42, or may be formed on both of the incidence surface 41 and the exit surface 42.

Moreover, although the objective lens 40 shown in FIG. 2 is the so-called single objective lens 40 composed of one optical element, it is also possible to select the optical surfaces (the incidence surface 41 and the exit surface 42) suitably on which the phase difference producing structure 50 is formed even if the objective lens 40 is composed of combined two or more optical elements.

As described above, according to the objective lens 40 and the optical pickup device 10 of the present embodiment, the optical system magnification m1 of the light beam having the wavelength $\lambda 1$ is set to be within a range of $-\frac{1}{20} \leq m1 \leq -\frac{1}{200}$, and the optical pickup device 10 is configured so as to make divergent light inclining to the optical axis L slightly enter the objective lens 40. Thereby, when the second optical information recording medium 30 having the protective substrate thickness t2 of 0.6 mm is used, an optical pickup device which is configured to be the infinite system and in which chromatic aberrations are corrected to the light beam having the wavelength $\lambda 2$ can be obtained.

Moreover, the optical pickup device 10 can include a correction function for suppressing the value of a formula $|\Delta fB/(\lambda 2 - \lambda 2')|$ (hereinafter referred to as a "best focus position change quantity") to be 0.1 μm/nm or less by the phase difference producing structure 50 formed on the objective lens 40 when the wavelength is changed from $\lambda 2$ to $\lambda 2'$, where $\Delta fB$ μm designates a distance in the direction of the optical axis L between two converging spots P formed by each of the light beams having the wavelengths $\lambda 2$ and $\lambda 2'$.

Incidentally, in the present embodiment, the phase difference producing structure 50 is formed on the objective lens 40. However, even if the phase difference producing structure 50 is not formed on the objective lens 40, it is possible to suppress the best focus position change quantity to be 1.0 μm/nm or less, and consequently the compatibility between the two kinds of optical information recording media of the DVD and the AOD can be sufficiently ensured. Moreover, in the case where the phase difference producing structure 50 is not formed on the objective lens 40, the objective lens 40 can be molded with glass. Consequently, it is possible to obtain an optical pickup device which is difficult to be influenced by a change in temperature and is superior in temperature characteristic.

Moreover, even if the phase difference producing structure 50 is formed on an optical element (for example, on the collimator lens 13 in the present embodiment) other than the objective optical element constituting the converging optical system, it is possible to obtain an optical pickup device including a correction function for suppressing the best focus position change quantity to be 0.1 μm/nm or less. Moreover, the phase difference producing structure 50 may be further formed on the objective lens 40 in this configuration.

Moreover, the aforesaid correction function can be obtained also by a prescribed quantity of movement of the optical element into the direction of the optical axis L without any provision of the phase difference producing structure 50 on the optical element.

Moreover, an optical information recording and reproducing device having compatibility enabling the execution of at least one of the recording of information to an optical information recording medium and the reproduction of the information recorded on the optical information recording medium can be obtained by, though the illustration thereof is omitted, the combination of a rotation drive device for holding the optical information recording medium rotatably, a control device for controlling the drives of those various devices, and the like with the optical pickup device 10.

Incidentally, in the embodiment described above, the structure in which a plurality of diffraction rings 51 is formed as the phase difference producing structure 50 has been described. However, the phase difference producing structure 50 according to the present invention is not limited to such a structure. For example, structures shown in FIGS. 3 and 4 may be adopted.

Figure 3:
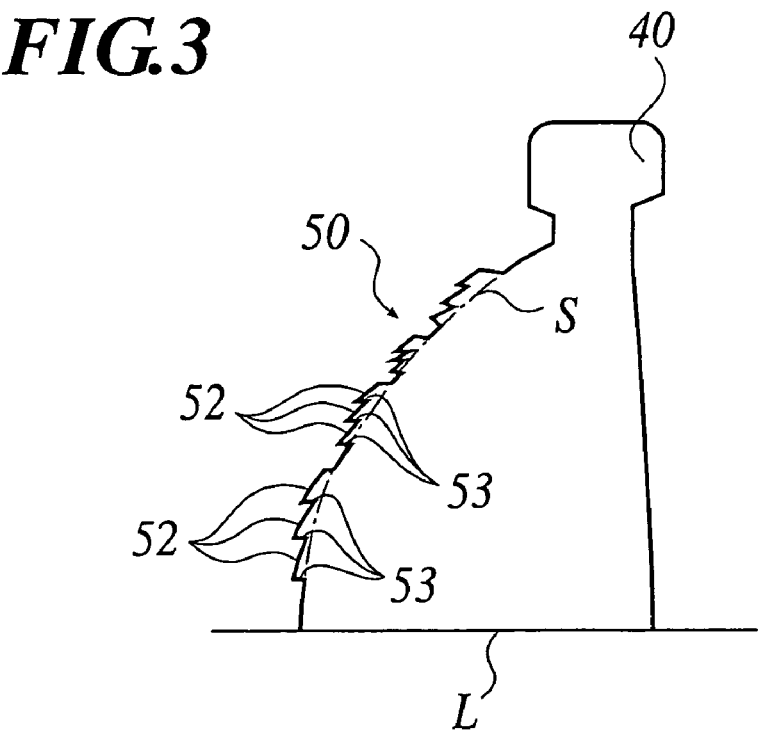
FIG. 3 is a transverse sectional view showing the principal part of another structure of the objective lens.

The objective lens 40 shown in FIG. 3 includes a phase difference producing structure 50 composed of a plurality of continuously formed ring surfaces 52 around the optical axis L as their centers with each of offsets 53 put between each of the ring surfaces 52 to be almost parallel to the optical axis L.

Each of the ring surfaces 52 is formed so as to protrude to a light source side as it is more distant from the optical axis L. The producing of a prescribed optical path difference to a light beam which has a wavelength $\lambda$ and has entered each of the ring surfaces 52 produces a phase difference between each light beam. Thus, the ring surfaces 52 are formed in order that the phases of the light beams that have passed through the respective rings 52 may become equal on the information recording plane 22 or 32 as a result. Incidentally, the shape of each offset can be regulated by means of a displacement magnitude to the mother aspheric surface S in the direction of the optical axis L.

Figure 4:
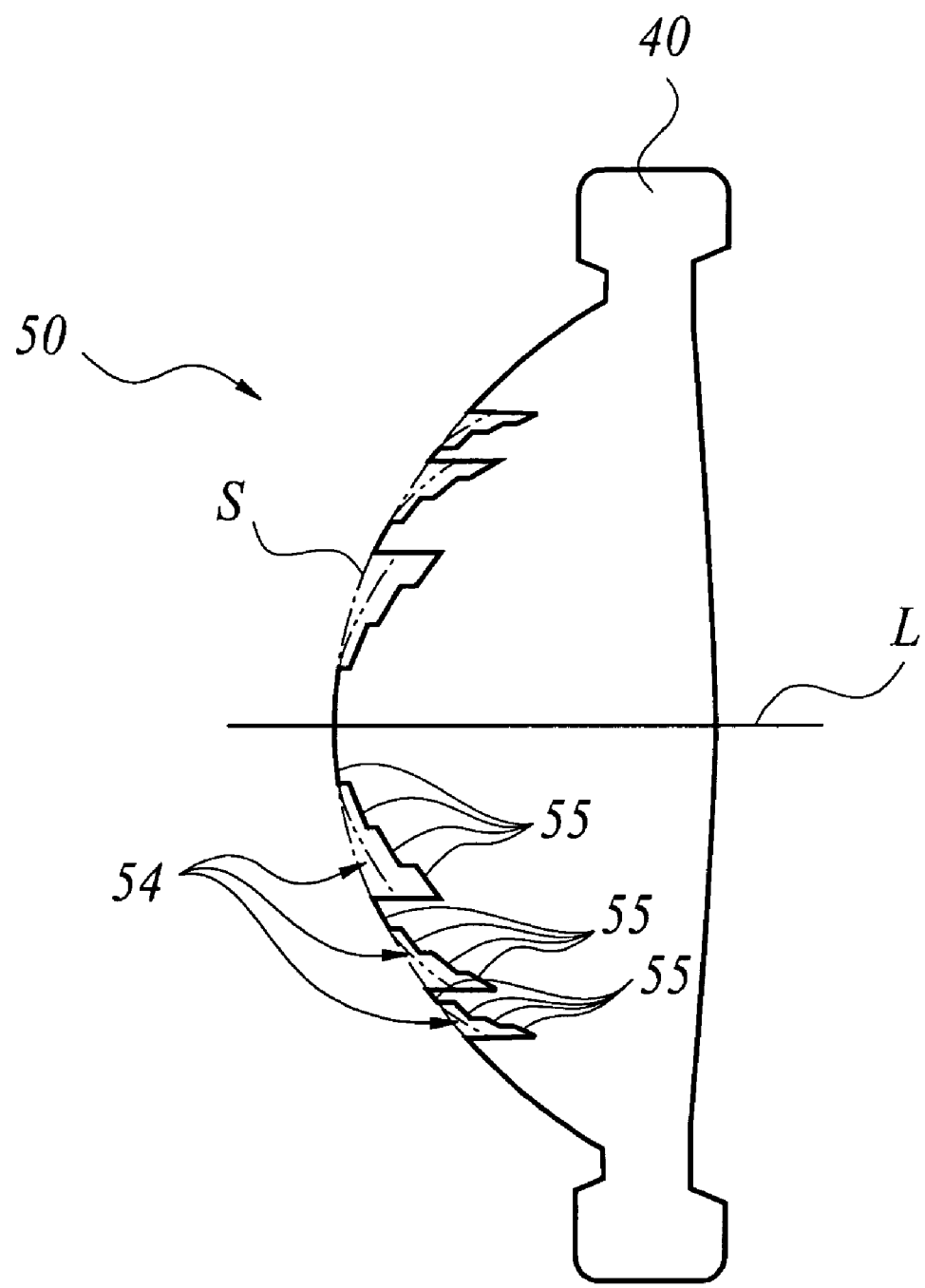
FIG. 4 is a transverse sectional view showing the principal part of a further structure of the objective lens.

In the objective lens 40 shown in FIG. 4, the phase difference producing structure 50 is composed of a plurality of diffraction rings 54 around the optical axis L as their centers, and stepwise discontinuity surfaces 55 formed on the optical surfaces of the diffraction rings 54 along the direction of the optical axis L.

To put it concretely, the plurality of diffraction rings 54 is formed on the objective lens 40. The diffraction rings 54 are formed around the optical axis L as their centers, and are the sawtooth-shaped discontinuity surfaces substantially inclining to an optical surface (the mother aspheric surface S) having a prescribed aspheric surface shape. Moreover, the stepwise discontinuity surfaces 55 along the optical axis L are formed on the optical surface of each of the diffraction rings 54 for producing prescribed optical path differences to the light beams passing thorough each of the diffraction rings 54.

Figures 5A, 5B:
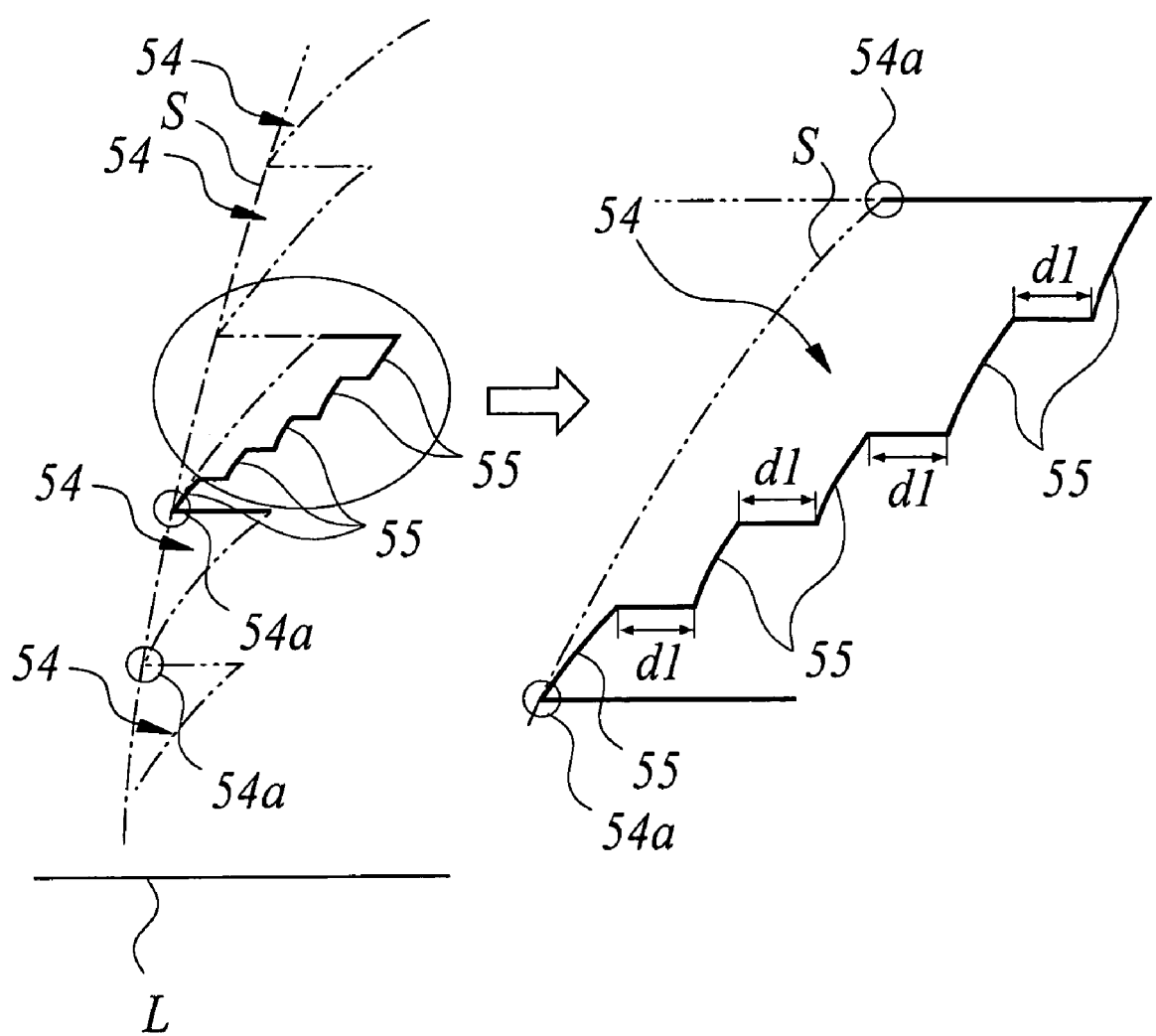
FIGS. 5A and 5B are transverse sectional views showing the principal part of a still further structure of the objective lens.

A line shown as an alternate long and short dash line in FIG. 5A indicates an optical surface (the mother aspheric surfaces S) having a virtual aspheric surface shape formed of the connection of the starting point 54a of each of the diffraction rings 54. Lines shown as alternate long and two short dashes lines in FIGS. 5A and 5B indicate external shapes of conventionally known concentric circular sawtooth-shaped diffraction rings formed around the optical axis L as their centers in shapes in which their thicknesses increase as they are more distant from the optical axis L.

Lines shown as solid lines in FIGS. 5A and 5B indicate an actual lens shape including the external shapes of the stepwise discontinuity surfaces 55 which are formed on the optical surface of each of the diffraction rings 54 and produce prescribed optical path differences of the light beams passing through the diffraction rings 54.

The depth d1 (the length of the direction of the optical axis L) of each of the discontinuity surfaces 55 is made to be almost equal to a value expressed by a formula $\lambda/(n-1)$ where n denotes the refractive index of the objective lens 40 to a light beam having the wavelength $\lambda$. The depth d1 is set at a length at which an optical path difference corresponding to almost one wavelength ($\lambda$) is produced between a light beam having the wavelength $\lambda$ that passes through one of the discontinuity surfaces 55 and a light beam having the wavelength $\lambda$ that passes through an adjacent one of the discontinuity surfaces 55 without any shifts of wave front.

Moreover, the shape of each of the discontinuity surfaces 55 is approximate to a shape formed by dividing the shape of the sawtooth-like surface of each of the diffraction rings 54 shown as the alternate long and two short dashes lines in FIGS. 5A and 5B into intervals corresponding to the respective discontinuity surfaces 55 to translate the divided intervals into the direction of the optical axis L.

SECOND EMBODIMENT

Figure 6:
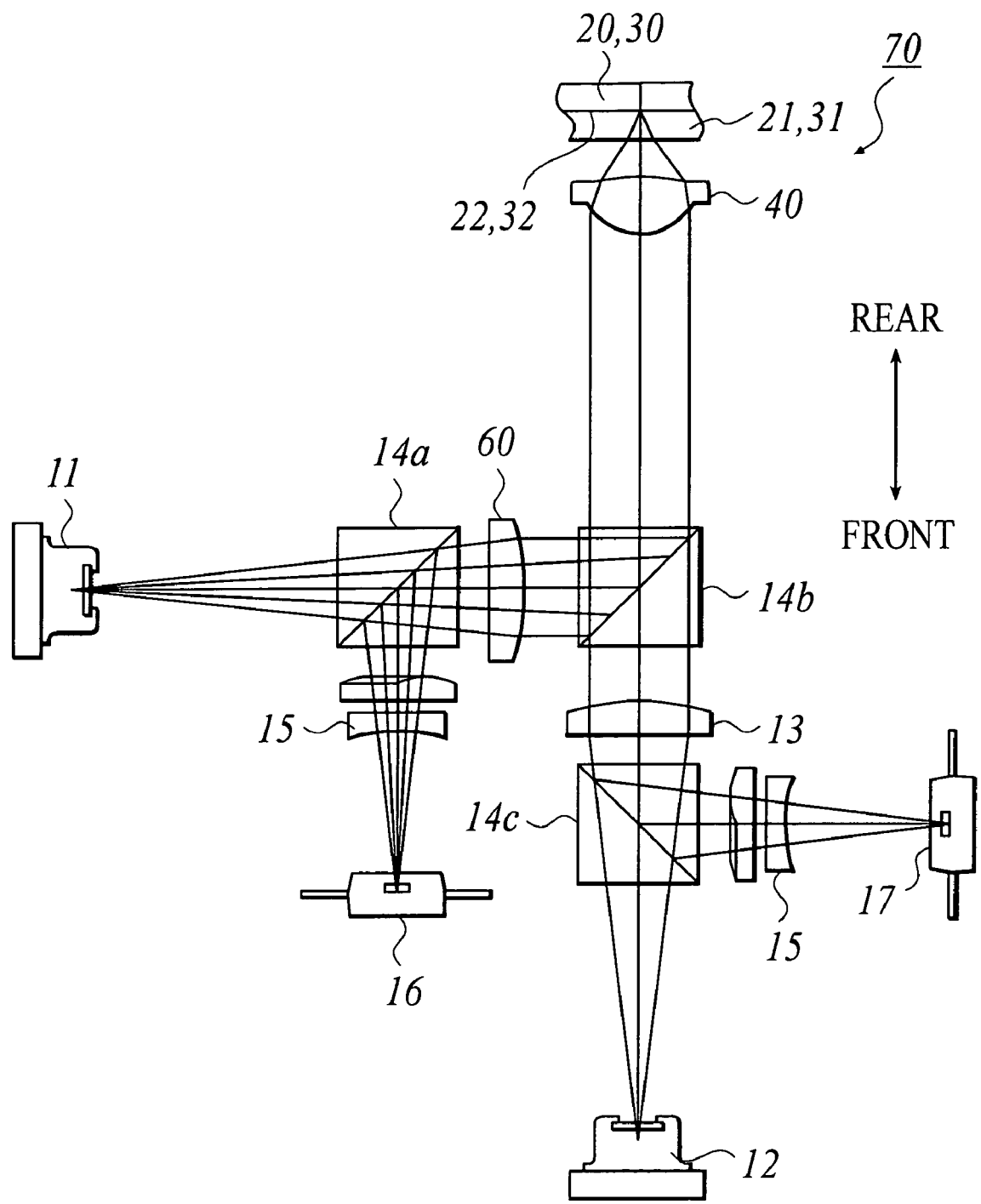
FIG. 6 is a schematic view showing an example of an optical pickup device according to a second embodiment.

Next, a second embodiment of the present invention will be described in view of FIG. 6.

In the present embodiment, the protective substrate thickness t1 of the first optical information recording medium 20 (DVD) is 0.6 mm, and the protective substrate thickness t2 of the second optical information recording medium 30 (AOD) is within a range of 0.70 mm$\leq$t2$\leq$0.77 mm. Moreover, the optical system magnification m1 of the objective lens 40 to the light beam of the wavelength $\lambda1$ is within the range of |m1|<0.01, and the optical system magnification m2 to the light beam of the wavelength $\lambda2$ is also within the range of |m2|<0.01. That is, the optical system magnifications m1 and m2 are almost zero. Consequently, both of the light beams of the wavelengths $\lambda1$ and $\lambda2$ enter the objective lens 40 as parallel light.

Incidentally, the main point of the difference of an optical pickup device 70 of the present embodiment from the optical pickup device 10 of the first embodiment is that the present embodiment is equipped with a collimator lens 60 for making the light beam having the wavelength $\lambda1$ parallel light. Because the shape of the objective lens 40 and the respect of the provision of the phase difference producing structure 50 into the objective lens 40 are the same as those of the first embodiment, the description of the actions of the optical pickup device 70 are omitted.

According to the objective lens 40 and the optical pickup device 70 of the present embodiment, the following optical pickup device can be obtained. That is, the optical pickup device can correct the spherical chromatic aberration of the light beam having the wave length $\lambda2$ in the configuration of the so-called infinite system even in case of using an AOD by making the protective substrate thickness t2 be within the range of 0.70 mm$\leq$t2$\leq$0.77 mm even when the optical pickup device 70 is designed to have the configuration of the infinite system in which substantially parallel light enters the objective lens 40 for correcting the chromatic aberration of the light beam having the wavelength $\lambda1$ at the time of the use of a DVD.

Incidentally, it is preferable that the protective substrate thickness t2 is made to be within the range of 0.72 mm$\leq$t2$\leq$0.76 mm. Thereby, the generation quantity of coma aberrations in the case where an optical information recording medium inclines toward the direction of the optical axis L can be suppressed.

EXAMPLES

Example 1

Next, a first example of the objective lens according to the present invention will be described.

The objective lens of the present example is a plastic lens which is made from a lens material having a dispersion value νd of 58.8 and has an incidence surface and an exit surface, each being an aspheric surface.

Incidentally, though it is not shown, in the present example, aberrations are corrected well to the degree of causing no practical problems in necessary numerical apertures for a DVD and an AOD.

Lens data of the objective lens is shown in Table 1 and Table 2.

TABLE 1

Example 1
νd = 58.5
Variation of best focusing position 0.6 μm/nm
f2 = 2.904 mm

| Surface Number | r (mm) | λ1 = 660 nm, m1 = 0 | | λ2 = 405 nm, m2 = 0 | | Remarks |
|---|---|---|---|---|---|---|
| | | d1 (mm) | n1 | d2 (mm) | n2 | |
| 1 | ∞ | 0 | 1.0 | 0 | 1.0 | Iris (φ 3.90 mm) |
| 2 | 1.927 | 2.5 | 1.5409 | 2.5 | 1.5604 | Plastic Objective Lens |
| 3 | −5.598 | 1.253 | 1.0 | 1.088 | 1.0 | |
| 4 | ∞ | 0.6 | 1.5772 | 0.755 | 1.6196 | Optical Disc Information Recording Surface |
| 5 | ∞ | | | | | |

TABLE 2

Aspheric surface data

Second surface (aspheric surface)
Aspheric surface coefficient

| κ | −0.56035 |
|---|---|
| A4 | 0.12797 × E−2 |
| A6 | 0.23353 × E−4 |
| A8 | 0.13075 × E−4 |
| A10 | 0.12556 × E−4 |
| A12 | −0.33349 × E−5 |

Third surface (aspheric surface)
Aspheric surface coefficient

| κ | −40.077 |
|---|---|
| A4 | 0.77584 × E−2 |
| A6 | −0.46964 × E−3 |
| A8 | −0.33084 × E−3 |
| A10 | −0.24495 × E−4 |
| A12 | 0.24326 × E−4 |

As shown in Table 1, the objective lens of the present example is set as follows. That is, the protective substrate thickness t1 of a DVD is 0.6 mm; the protective substrate thickness t2 of an AOD is 0.755 mm; the focal length f1 of a light beam emitted from the first light source is 3.00 mm when the light beam has a wavelength λ1 of 660 nm; the numerical aperture on an image side NA1 is 0.65; the optical system magnification m1 is zero; the focal length f2 of a light beam emitted from the second light source is 2.904 mm when the light beam has a wavelength λ2 of 405 nm; the numerical aperture on an image side NA2 is 0.67; and an imaging magnification m2 is zero.

Surface numbers 2 and 3 in Table 1 denote the incidence surface and the exit surface of the objective lens, respectively. Moreover, ri denotes a curvature radius; di denotes each position of from the ith surface to the (i+1)th surface in the direction of the optical axis L; and ni denotes the refractive index of each surface.

The second surface and the third surface are each formed to be an aspheric surface which is axial symmetry around the optical axis L and is regulated by substituting the coefficients shown in Table 1 and Table 2 into the following numerical formula (Formula 1).

Formula of Aspheric Surface Shape $$X(h) = \frac{\left(\frac{h^2}{r_i}\right)}{1 + \sqrt{1 - (1+\kappa)\left(\frac{h}{r_i}\right)^2}} + \sum_{i=0}^{n} A_{2i} h^{2i}$$

Hereupon, X(h) denotes an axis of the direction of the optical axis L (the traveling direction of light is supposed to be positive), κ denotes a conic constant, and $A_{2i}$ denotes an aspheric surface coefficient.

As shown in Table 1, it is found that the quantity of the variation of the best focusing position is 0.6 μm/nm (<1.0 μm/nm), and that the objective lens of the present example has a sufficient correction function.

Example 2

Next, a second example of the objective lens according to the present invention will be described.

The objective lens of the present example is a glass lens which is made from a lens material having a dispersion value νd of 70.2 and has an incidence surface and an exit surface, each being an aspheric surface.

Incidentally, though it is not shown, in the present example, aberrations are corrected well to the degree of causing no practical problems in necessary numerical apertures for a DVD and an AOD.

Lens data of the objective lens is shown in Table 3 and Table 4.

TABLE 3

Example 2
νd = 70.2
Variation of best focusing position 0.4 μm/nm
f2 = 2.927 mm

| Surface Number | r (mm) | λ1 = 660 nm, m1 = 0 | | λ2 = 405 nm, m2 = 0 | | Remarks |
|---|---|---|---|---|---|---|
| | | d1 (mm) | n1 | d2 (mm) | n2 | |
| 1 | ∞ | 0 | 1.0 | 0 | 1.0 | Iris (φ 3.90 mm) |
| 2 | 1.814 | 2.5 | 1.4853 | 2.5 | 1.4990 | Glass Objective Lens FK5 |
| 3 | −4.050 | 1.269 | 1.0 | 1.121 | 1.0 | |
| 4 | ∞ | 0.6 | 1.5772 | 0.75 | 1.6196 | Optical Disc |

TABLE 3-continued

Example 2
νd = 70.2
Variation of best focusing position 0.4 μm/nm
f2 = 2.927 mm

|  |  |  | λ1 = 660 nm,<br>m1 = 0 |  | λ2 = 405 nm,<br>m2 = 0 |  |
|---|---|---|---|---|---|---|
| Surface<br>Number | r (mm) | d1<br>(mm) | n1 | d2<br>(mm) | n2 | Remarks |
| 5 | ∞ |  |  |  |  | Information<br>Recording<br>Surface |

TABLE 4

Aspheric surface data

Second surface (aspheric surface)
Aspheric surface coefficient

| κ | −0.56637 |
|---|---|
| A4 | 0.98597 × E−3 |
| A6 | −0.11091 × E−4 |
| A8 | 0.88385 × E−6 |
| A10 | 0.16533 × E−4 |
| A12 | −0.39832 × E−5 |

Third surface (aspheric surface)
Aspheric surface coefficient

| κ | −21.427 |
|---|---|
| A4 | 0.87516 × E−2 |
| A6 | −0.88214 × E−3 |
| A8 | −0.25341 × E−3 |
| A10 | 0.28977 × E−4 |
| A12 | 0.75277 × E−5 |

As shown in Table 3, the objective lens of the present example is set as follows. That is, the protective substrate thickness t1 of a DVD is 0.6 mm; the protective substrate thickness t2 of an AOD is 0.75 mm; the focal length f1 of a light beam emitted from the first light source is 3.00 mm when the light beam has a wavelength λ1 of 660 nm; the numerical aperture on an image side NA1 is 0.65; the optical system magnification m1 is zero; the focal length f2 of a light beam emitted from the second light source is 2.927 mm when the light beam has a wavelength λ2 of 405 nm; the numerical aperture on an image side NA2 is 0.67; and the imaging magnification m2 is zero.

The second surface and the third surface of the objective lens are each formed to be an aspheric surface which is axial symmetry around the optical axis L and is regulated by substituting the coefficients shown in Table 3 and Table 4 into the above-mentioned numerical formula (Formula 1).

As shown in Table 3, it is found that the quantity of the variation of the best focusing position is 0.4 μm/nm (<1.0 μm/nm), and that the objective lens of the present example has a sufficient correction function.

Example 3

Next, a third example of the objective lens according to the present invention will be described.

The objective lens of the present example is a glass lens which is made from a lens material having a dispersion value νd of 81.6 and has an incidence surface and an exit surface, each being an aspheric surface.

Incidentally, though it is not shown, in the present example, aberrations are corrected well to the degree of causing no practical problems in necessary numerical apertures for a DVD and an AOD.

Lens data of the objective lens is shown in Table 5 and Table 6.

TABLE 5

Example 3
νd = 81.6
Variation of best focusing position 0.3 μm/nm
f2 = 3.00 mm

|  |  |  | λ1 = 660 nm,<br>m1 = 0 |  | λ2 = 405 nm,<br>m2 = 0 |  |
|---|---|---|---|---|---|---|
| Surface<br>Number | r (mm) | d1<br>(mm) | n1 | d2<br>(mm) | n2 | Remarks |
| 1 | ∞ | 0 | 1.0 | 0 | 1.0 | Iris (φ 3.90 mm) |
| 2 | 1.869 | 2.5 | 1.4951 | 2.5 | 1.5072 | Glass<br>Objective<br>Lens FK01 |
| 3 | −4.497 | 1.328 | 1.0 | 1.199 | 1.0 |  |
| 4 | ∞ | 0.6 | 1.5772 | 0.73 | 1.6196 | Optical<br>Disc |
| 5 | ∞ |  |  |  |  | Information<br>Recording<br>Surface |

TABLE 6

Aspheric surface data

Second surface (aspheric surface)
Aspheric surface coefficient

| κ | −0.55124 |
|---|---|
| A4 | 0.93545 × E−3 |
| A6 | 0.38296 × E−4 |
| A8 | 0.38743 × E−4 |
| A10 | −0.99819 × E−5 |
| A12 | 0.13370 × E−5 |

Third surface (aspheric surface)
Aspheric surface coefficient

| κ | −23.086 |
|---|---|
| A4 | 0.11664 × E−1 |
| A6 | −0.24072 × E−2 |
| A8 | 0.40098 × E−4 |
| A10 | 0.14803 × E−3 |
| A12 | −0.27832 × E−4 |

As shown in Table 5, the objective lens of the present example is set as follows. That is, the protective substrate thickness t1 of a DVD is 0.6 mm; the protective substrate thickness t2 of an AOD is 0.73 mm; the focal length f1 of a light beam emitted from the first light source is 3.07 mm when the light beam has a wavelength λ1 of 660 nm; the numerical aperture on an image side NA1 is 0.636; the optical system magnification m1 is zero; the focal length f2 of a light beam emitted from the second light source is 3.00 mm when the light beam has a wavelength λ2 of 405 nm; the numerical aperture on an image side NA2 is 0.65; and the imaging magnification m2 is zero.

The second surface and the third surface of the objective lens are each formed to be an aspheric surface which is axial symmetry around the optical axis L and is regulated by substituting the coefficients shown in Table 5 and Table 6 into the above-mentioned numerical formula (Formula 1).

As shown in Table 5, it is found that the quantity of the variation of the best focusing position is 0.3 μm/nm (<1.0

μm/nm), and that the objective lens of the present example has a sufficient correction function.

Example 4

Next, a fourth example of the objective lens according to the present invention will be described.

The objective lens of the present example is a glass lens which is made from a lens material having a dispersion value vd of 64.1 and has an incidence surface and an exit surface, each being an aspheric surface.

Incidentally, though it is not shown, in the present example, aberrations are corrected well to the degree of causing no practical problems in necessary numerical apertures for a DVD and an AOD.

Lens data of the objective lens is shown in Table 7 and Table 8.

TABLE 7

Example 4
vd = 64.1
Variation of best focusing position 0.5 μm/nm
f2 = 3.00 mm

|  |  | $\lambda 1$ = 660 nm, m1 = −0.02 |  | $\lambda 2$ = 405 nm, m2 = 0 |  |
|---|---|---|---|---|---|
| Surface Number | r (mm) | d1 (mm) | n1 | d2 (mm) | n2 | Remarks |
| 1 | ∞ | 0 | 1.0 | 0 | 1.0 | Iris (φ 3.90 mm) |
| 2 | 1.900 | 2.5 | 1.5137 | 2.5 | 1.5297 | Glass Objective Lens BK7 |
| 3 | −5.292 | 1.387 | 1.0 | 1.262 | 1.0 |  |
| 4 | ∞ | 0.6 | 1.5772 | 0.6 | 1.6196 | Optical Disc Information Recording Surface |
| 5 | ∞ |  |  |  |  |  |

TABLE 8

Aspheric surface data

Second surface (aspheric surface)
Aspheric surface coefficient

| κ | −0.59617 |
| A4 | 0.19086 × E−2 |
| A6 | 0.16071 × E−3 |
| A8 | 0.47346 × E−4 |
| A10 | −0.77274 × E−5 |
| A12 | 0.15327 × E−5 |

Third surface (aspheric surface)
Aspheric surface coefficient

| κ | −31.694 |
| A4 | 0.11854 × E−1 |
| A6 | −0.26138 × E−2 |
| A8 | 0.15264 × E−3 |
| A10 | 0.11540 × E−3 |
| A12 | −0.24552 × E−4 |

As shown in Table 7, the objective lens of the present example is set as follows. That is, the protective substrate thickness t1 of a DVD is 0.6 mm; the protective substrate thickness t2 of an AOD is 0.6 mm; the focal length f1 of a light beam emitted from the first light source is 3.14 mm when the light beam has a wavelength $\lambda 1$ of 660 nm; the numerical aperture on an image side NA1 is 0.622; the optical system magnification m1 is −0.02; the focal length f2 of a light beam emitted from the second light source is 3.00 mm when the light beam has a wavelength $\lambda 2$ of 405 nm; the numerical aperture on an image side NA2 is 0.65; and the imaging magnification m2 is zero.

The second surface and the third surface of the objective lens are each formed to be an aspheric surface which is axial symmetry around the optical axis L and is regulated by substituting the coefficients shown in Table 7 and Table 8 into the above-mentioned numerical formula (Formula 1).

As shown in Table 7, it is found that the quantity of the variation of the best focusing position is 0.5 μm/nm (<1.0 μm/nm), and that the objective lens of the present example has a sufficient correction function.

Comparative Example 1

Next, a comparative example of the objective lens will be described.

The objective lens of the present comparative example is a glass lens which is made from a lens material having a dispersion value vd of 33.8 and has an incidence surface and an exit surface, each being an aspheric surface, as shown in Table 9.

Lens data of the objective lens is shown in Table 9 and Table 10.

TABLE 9

Comparative Example
vd = 33.8
Variation of best focusing position 1.2 μm/nm
f2 = 3.00 mm

|  |  | $\lambda 1$ = 660 nm, m1 = 0 |  | $\lambda 2$ = 405 nm, m2 = 0 |  |
|---|---|---|---|---|---|
| Surface Number | r (mm) | d1 (mm) | n1 | d2 (mm) | n2 | Remarks |
| 1 | ∞ | 0 | 1.0 | 0 | 1.0 | Iris (φ 3.90 mm) |
| 2 | 2.193 | 2.5 | 1.6425 | 2.5 | 1.6829 | Glass Objective Lens SF12 |
| 3 | −16.728 | 1.383 | 1.0 | 1.131 | 1.0 |  |
| 4 | ∞ | 0.6 | 1.5772 | 0.78 | 1.6196 | Optical Disc Information Recording Surface |
| 5 | ∞ |  |  |  |  |  |

TABLE 10

Aspheric surface data

Second surface (aspheric surface)
Aspheric surface coefficient

| κ | −0.55124 |
| A4 | 0.93545 × E−3 |
| A6 | 0.38296 × E−4 |
| A8 | 0.38743 × E−4 |
| A10 | −0.99819 × E−5 |
| A12 | 0.13370 × E−5 |

Third surface (aspheric surface)
Aspheric surface coefficient

| κ | −23.086 |
| A4 | 0.11664 × E−1 |
| A6 | −0.24072 × E−2 |
| A8 | 0.40098 × E−4 |
| A10 | 0.14803 × E−3 |
| A12 | −0.27832 × E−4 |

As shown in Table 9, the objective lens of the present comparative example is set as follows. That is, the protective substrate thickness t1 of a DVD is 0.6 mm; the protective substrate thickness t2 of an AOD is 0.78 mm; the focal length fi of a light beam emitted from the first light source is 3.18 mm when the light beam has a wavelength λ1 of 660 nm; the numerical aperture on an image side NA1 is 0.613; the optical system magnification m1 is zero; the focal length f2 of a light beam emitted from the second light source is 3.00 mm when the light beam has a wavelength λ2 of 405 nm; the numerical aperture on an image side NA2 is 0.65; and the imaging magnification m2 is zero.

The second surface and the third surface of the objective lens are each formed to be an aspheric surface which is axial symmetry around the optical axis L and is regulated by substituting the coefficients shown in Table 9 and Table 10 into the above-mentioned numerical formula (Formula 1).

As shown in Table 9, it is found that the quantity of the variation of the best focusing position is 1.2 μm/nm (>1.0 μm/nm) and the objective lens of the present comparative example has not a sufficient correction function.

Example 5

Next, an example of the optical pickup device according to the present invention will be described.

The optical pickup device of the present example is equipped with the objective lens of Example 2 and a coupling lens including a diffractive structure (diffraction rings) as a phase difference producing structure.

Incidentally, though it is not shown, in the present example, aberration is corrected well to the degree of causing no practical problems in necessary numerical apertures for a DVD and an AOD.

Lens data of the coupling lens and the objective lens is shown in Table 11 and Table 12.

TABLE 11

Example 5

| Surface Number | r (mm) | λ2 = 405 nm | | λ2' = 410 nm | | Remarks |
|---|---|---|---|---|---|---|
| | | d2 (mm) | n2 | d2' (mm) | n2' | |
| 0 | — | 17.62 | 1.0 | 17.62 | 1.0 | Light Source |
| 1 | 20.983 | 1.3 | 1.5249 | 1.3 | 1.5241 | Coupling Lens |
| 2 | −25.21 | 5.0 | 1.0 | 5.0 | 1.0 | |
| 3 | ∞ | 0 | 1.0 | 0 | 1.0 | Iris (φ 3.90 mm) |
| 4 | 1.814 | 2.5 | 1.4990 | 2.5 | 1.4984 | Glass Objective Lens FK7 |
| 5 | −4.050 | 1.0459 | 1.0 | 1.0459 | 1.0 | |
| 6 | ∞ | 0.75 | 1.6196 | 0.75 | 1.6177 | Optical Disc |
| 7 | ∞ | | | | | Information Recording Surface |

TABLE 12

Aspheric surface data

Second surface (diffraction surface)
Blazed wavelength 405 nm third order diffraction
Mother aspheric surface

| κ | −11.462 |
| A4 | 8.0342 × E−4 |
| A6 | −1.4205 × E−4 |

TABLE 12-continued

Aspheric surface data

Diffraction

| B0 | −3.1117 × E−3 |
| B2 | −3.2527 × E−4 |
| B4 | 3.4985 × E−5 |

Fourth surface (aspheric surface)
Aspheric surface coefficient

| κ | −0.56637 |
| A4 | 0.98597 × E−3 |
| A6 | −0.11091 × E−4 |
| A8 | 0.88385 × E−6 |
| A10 | 0.16533 × E−4 |
| A12 | −0.39832 × E−5 |

Fifth surface (aspheric surface)
Aspheric surface coefficient

| κ | −21.427 |
| A4 | 0.87516 × E−2 |
| A6 | −0.88214 × E−3 |
| A8 | −0.25341 × E−3 |
| A10 | 0.28977 × E−4 |
| A12 | 0.75277 × E−5 |

Incidentally, Table 11 shows data in the case where the light beam having the wavelength λ2=405 nm emitted from the second light source has changed to the wavelength of λ2'=410 nm owing to a mode hop.

The surface number 2 in Table 11 denotes the incident surface of the coupling lens, and the surface numbers 4 and 5 denote the incident surface and exit surface of the objective lens, respectively.

The second surface, the fourth surface and the fifth surface are each formed to be an aspheric surface which is axial symmetry around the optical axis L and is regulated by substituting the coefficients shown in Table 11 and Table 12 into the above-mentioned numerical formula (Formula 1).

Moreover, the pitch of the diffraction rings formed on the second surface is regulated by substituting the coefficients shown in Table 12 into the following optical path difference function of Formula 2.

Optical Path Difference Function $$\phi(h) = \sum_{i=0}^{n} B_{2i} h^{2i}$$

Hereupon, $B_{2i}$ denotes a coefficient of the optical path difference function. Moreover, the blazed wavelength pertaining to the diffraction rings is 405 nm.

Moreover, as shown in Table 12, the third diffracted light of the light beam having the wavelength of λ2 is used.

In the present example, the quantity of the variation of the best focusing position was 0.1 μm/nm or less. This is probably attributed to that the function suppressing the quantity of the variation of the best focusing position is increased by the cooperation of the objective lens shown in the above-mentioned second example and the coupling lens equipped with the diffractive structure.

Incidentally, in the present example, the above-mentioned diffractive structure for suppressing defocus changes at the time of a change of the wavelength is formed on the coupling lens. However, the formation of the diffractive structure on the object lens brings about similar effects, or a separated diffraction element may be provided independently of the coupling lens and the objective lens.

According to the present invention, an objective optical element, an optical pickup device and an optical information recording and reproducing device, all having the compatibility of an AOD with the other optical information recording media and capable of suppressing spherical chromatic aberrations can be obtained.

What is claimed is:

1. An objective optical element to be used for an optical pickup device for performing reproducing and/or recording of information to a first optical information recording medium and a second optical information recording medium by converging a light beam having a wavelength $\lambda 1$ (640 nm$\leq \lambda 1 \leq$670 nm) on an information recording surface of the first optical information recording medium having a protective substrate thickness t1 (t1=0.6 mm), and by converging a light beam having a wavelength $\lambda 2$ (400 nm$\leq \lambda 2 \leq$415 nm) on an information recording surface of the second optical information recording medium having a protective substrate thickness t2 (t2=0.6 mm);

wherein an optical system magnification m2 of the objective optical element to the light beam having the wavelength $\lambda 2$ satisfies a relation of |m2|<0.01, and wherein an optical system magnification m1 of the objective optical element to the light beam having the wavelength $\lambda 1$ satisfies a relation of $-1/20 \leq m1 \leq -1/200$.

2. The objective optical element of claim 1, wherein the objective optical element comprises a single lens, and a dispersion value vd of a lens material of the single lens satisfies a relation of vd$\geq$50.

3. The objective optical element of claim 1, further comprising a correction function for suppressing a value of |$\Delta fB/(\lambda 2-\lambda 2')$| to be 1.0 $\mu$m/nm or less, where $\Delta fB$ $\mu$m denotes a distance in an optical axis direction between two converging spots formed by the light beam having the wavelength $\lambda 2$ and a light beam having a wavelength $\lambda 2'$, respectively, when the wavelength $\lambda 2$ of the light beam is changed to $\lambda 2'$.

4. The objective optical element of claim 1, further comprising a phase difference producing structure for producing a phase difference of a passing light beam on an at least one optical surface.

5. The objective optical element of claim 4, wherein a correction function for suppressing a value of |$\Delta fB/(\lambda 2-\lambda 2')$| to be 0.1 $\mu$m/nm or less is obtained by the phase difference producing structure, where $\Delta fB$ $\mu$m denotes a distance in an optical axis direction between two converging spots formed by the light beam having the wavelength $\lambda 2$ and a light beam having a wavelength $\lambda 2'$, respectively, when the wavelength $\lambda 2$ of the light beam is changed to $\lambda 2'$.

6. The objective optical element of claim 1, wherein the objective optical element is made of a glass material.

7. An optical pickup device comprising: a first light source for emitting a first light beam having a wavelength $\lambda 1$ (640 nm$\leq \lambda 1 \leq$670 nm), a second light source for emitting a second light beam having a wavelength $\lambda 2$ (400 nm$\leq \lambda 2 \leq$415 nm), and a converging optical system for converging the first light beam having the wavelength $\lambda 1$ on an information recording surface of a first optical information recording medium having a protective substrate having a thickness of t1 (t1=0.6 mm), and for converging the second light beam having the wavelength $\lambda 2$ on an information recording surface of a second optical information recording medium having a protective substrate having a thickness of t2 (t2=0.6 mm), wherein the converging optical system comprises an objective optical element of claim 1.

8. The optical pickup device of claim 7, wherein the converging optical system comprises an optical element for carrying out a correction that a value of |$\Delta fB'/(\lambda 2-\lambda 2')$| to be 0.1 $\mu$m/nm or less, where $\Delta fB'$ $\mu$m denotes a distance in an optical axis direction between two converging spots formed by passing the light beam having the wavelength $\lambda 2$ and a light beam having a wavelength $\lambda 2'$ through the converging optical system, respectively, when the wavelength $\lambda 2$ of the light beam is changed to $\lambda 2'$.

9. The optical pickup device of claim 8, wherein the correction is carried out by moving the optical element in the optical axis direction.

10. The optical pickup device of claim 8, wherein the optical element comprises a phase difference producing structure for producing a phase difference of a passing light beam on an at least one optical surface, and the correction is carried out by the phase difference producing structure.

11. The optical pickup device of claim 10, wherein the phase difference producing structure is a diffractive structure for converging an n-th (n is a natural number) order diffracted light generated by producing a phase difference in the light beam having the wavelength $\lambda 1$ with the phase difference producing structure on the information recording surface of the first optical information recording medium, and for converging an m-th (m$\neq$n: m is a natural number) order diffracted light generated by producing a phase difference in the light beam having the wavelength $\lambda 2$ with the phase difference producing structure on the information recording surface of the second optical information recording medium.

12. An optical information recording and reproducing device comprising the optical pickup device of claim 7, wherein at least one of recording of information to the first optical information recording medium and the second optical information recording medium and reproducing of information recorded to the first optical information recording medium and the second optical information recording medium, is executable.

* * * * *